W. O. QUEST.
SPRAYING MACHINE.
APPLICATION FILED SEPT. 2, 1910.

1,022,206.

Patented Apr. 2, 1912.

3 SHEETS—SHEET 1.

WITNESSES

INVENTOR
William O. Quest.
By Fred'k H. Winter
Attorney

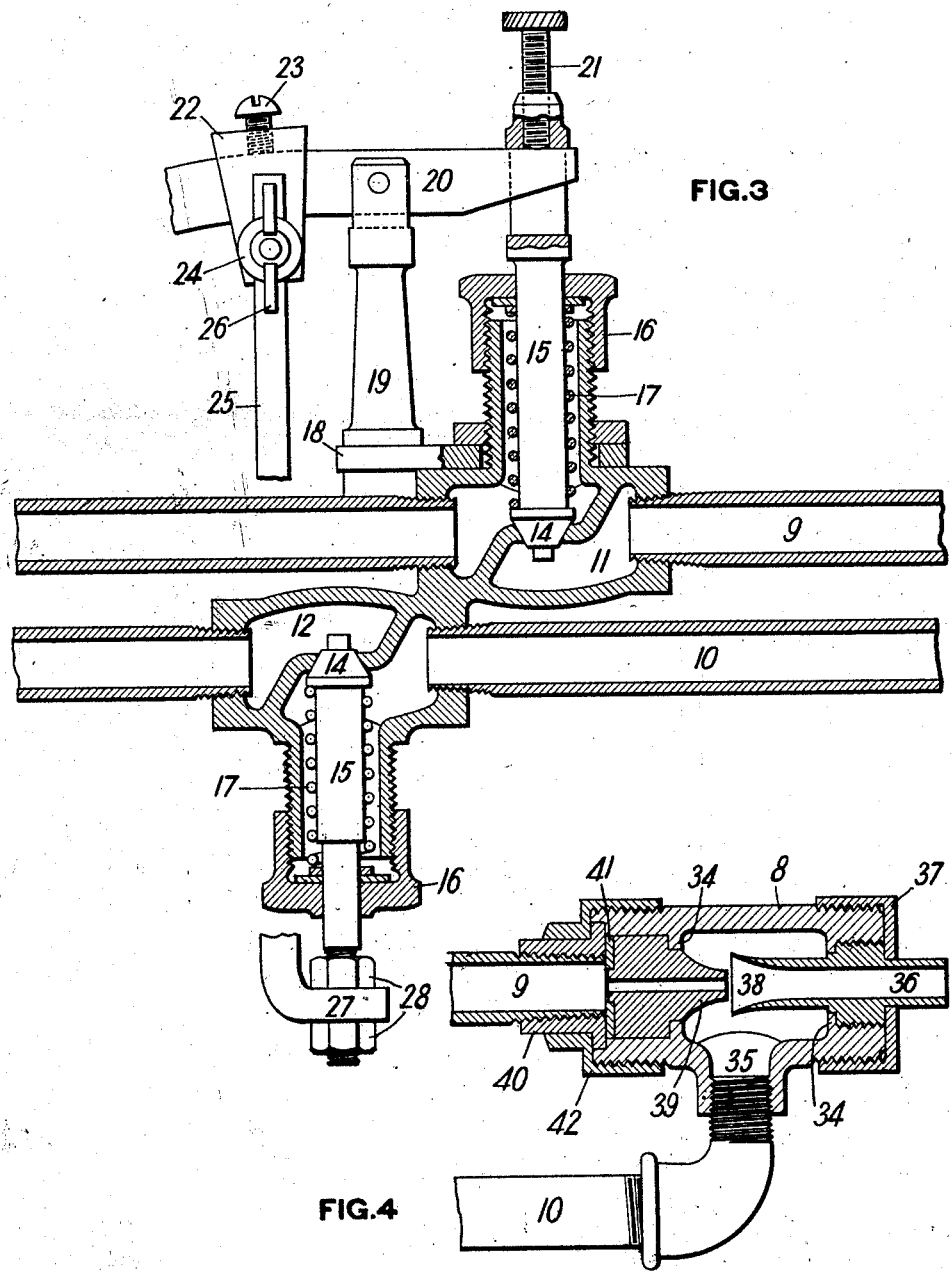

UNITED STATES PATENT OFFICE.

WILLIAM O. QUEST, OF PITTSBURGH, PENNSYLVANIA.

SPRAYING-MACHINE.

1,022,206.     Specification of Letters Patent.     Patented Apr. 2, 1912.

Application filed September 2, 1910. Serial No. 580,245.

*To all whom it may concern:*

Be it known that I, WILLIAM O. QUEST, a resident of Pittsburgh, in the county of Allegheny and State of Pennsylvania, have invented a new and useful Improvement in Spraying-Machines, of which the following is a specification.

This invention relates to spraying machines, and more particularly to machines for applying a liquid coating material, such as paints, calcimine, whitewash, and other substances, to railway cars, walls or bodies of any character.

The object of the invention is to provide a device for the purpose stated which is of simple construction, which can be readily handled and used, which can be readily cleaned and kept in perfect working order, and by means of which the coating material can be expeditiously and uniformly applied to the body or surface.

The invention comprises the construction and arrangement of parts hereinafter described and claimed.

Figure 1:
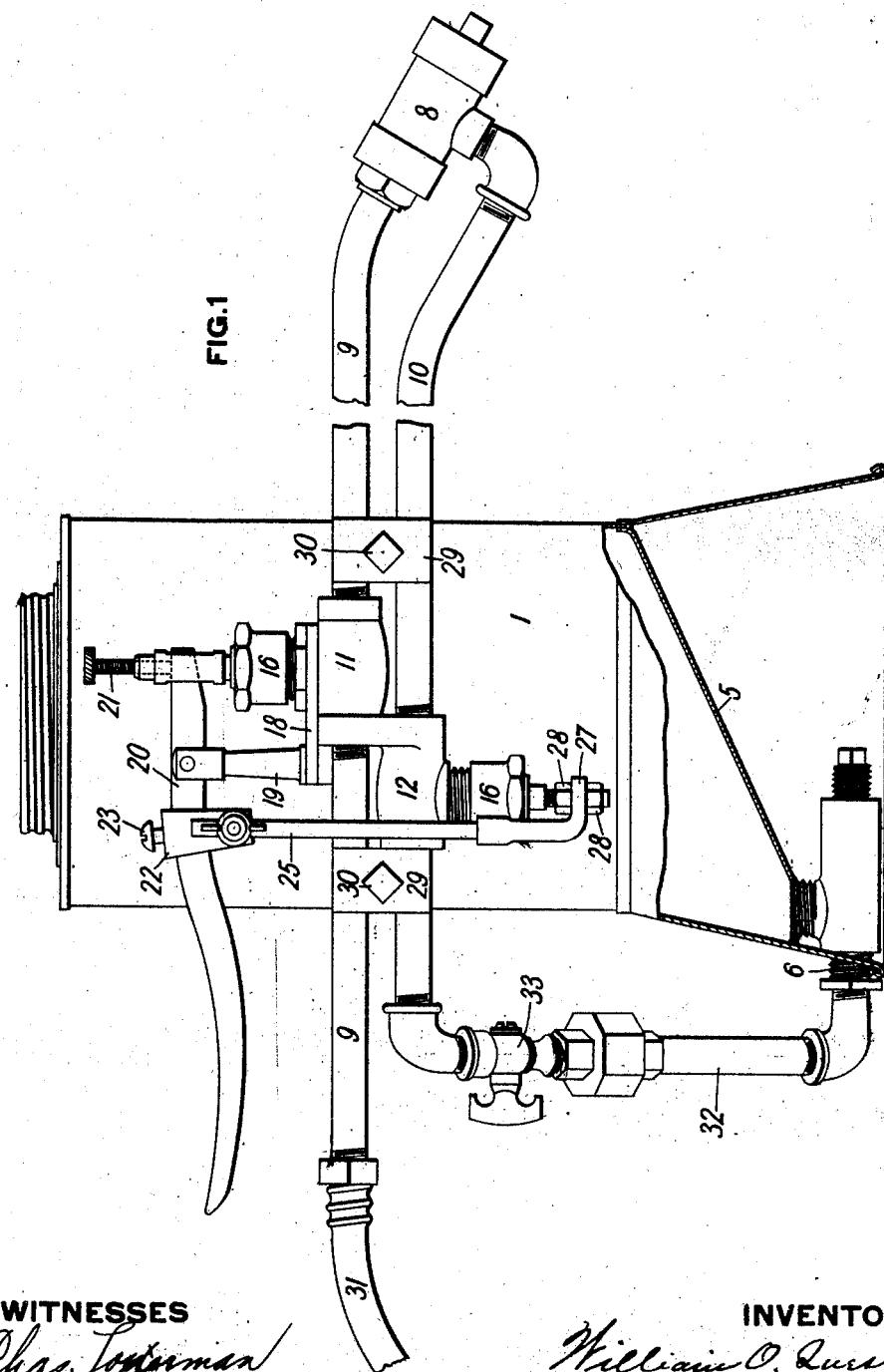
Figure 2:
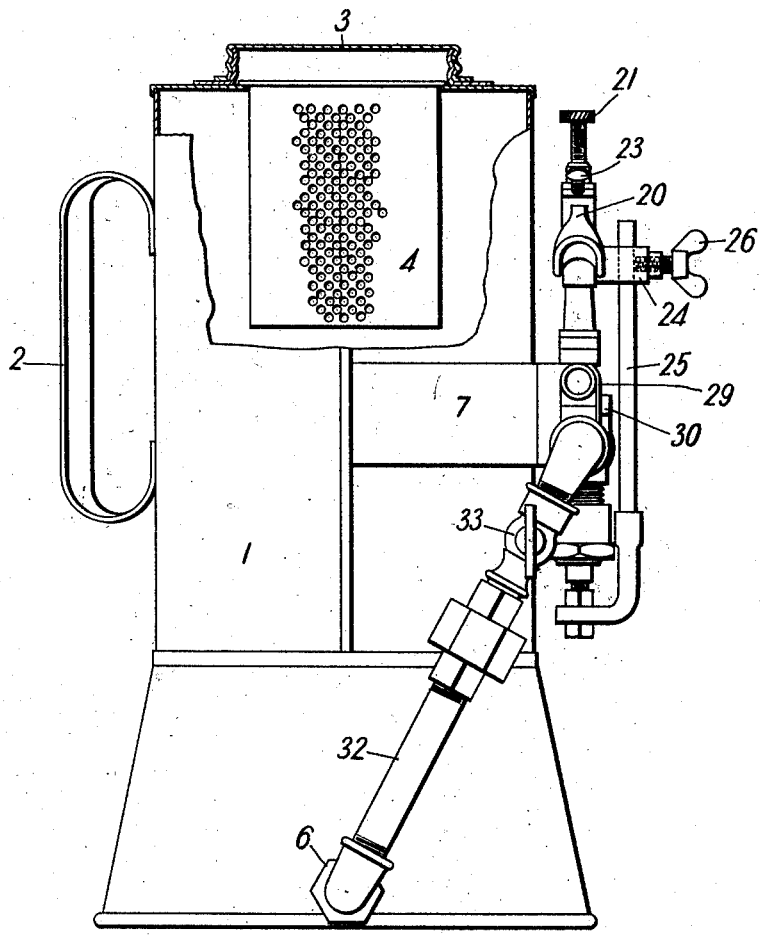

In the accompanying drawings Figure 1 is a side elevation of the device with the lower portion of the tank shown in vertical section; Fig. 2 is an end elevation of the same with the upper portion of the tank shown in vertical section; Fig. 3 is a sectional view of the regulating valves and their operating means; and Fig. 4 is a sectional view through the spraying head.

In the drawings 1 indicates a suitable tank for the coating or spraying material, such as paint, calcimine, whitewash or other liquid. This tank will be of a size to contain such a quantity of coating material as can be readily handled by the operator. The tank is provided on one side with a handle 2, and at its upper end with an opening for supplying the spraying material thereto, said opening being adapted to be tightly sealed by the threaded closure 3. A strainer 4 is suspended within the tank below the filling opening, to strain from the spraying material any solid or semi-solid substances which would clog the spraying head. The bottom 5 of the tank slopes from one side toward the other, and is also curved in the other direction, so as to form a sort of a funnel or hopper leading downwardly to the outlet at 6, in order that the tank may be drained of its entire contents.

Secured to the tank at one side thereof is a bracket 7 to which the spraying devices are secured. The spraying devices comprise a spraying head 8 having connected thereto the fluid pressure pipe 9 and the liquid pipe 10. Each of these devices is provided with a suitable control valve. In the pipe 9 is a valve 11 for controlling the fluid pressure medium, such as air or gas, while in the pipe 10 is a similar valve 12 for controlling the flow of the spraying material. These valves may be of any suitable type, and are shown substantially as globe valves, having their chambers divided by partitions provided with openings which are controlled by the valves 14. These valves are provided with stems 15 projecting through the bonnets and stuffing boxes 16, spiral springs 17 being provided between the valves and bonnets and serve to normally seat said valves to close the passages through the valve castings. This form of valve is well known and will be understood without further description.

Secured to the valve 11 or other suitable support is a bracket 18 from which rises a post 19 to whose upper end is fulcrumed the valve operating lever 20. One end of this lever extends into a vertical slot in the upper end of the stem 15 of valve 11. A screw 21 is threaded through the upper end of the stem and its end serves as an adjustable abutment for the end of lever 20, so that the point at which the lever begins to open the fluid pressure valve can be regulated, as will be readily understood. On the lever 20 on the other side of its fulcrum is a yoke 22, movable lengthwise of said lever and adapted to be secured thereto at any desired point by a set screw 23. The portion of the lever engaged by the yoke is preferably slightly curved or arc shaped, and by means of the set screw the distance of the yoke from the fulcrum of the lever can be varied as desired. This yoke carries a horizontal projecting member 24 provided with a vertical opening in which is loosely fitted a rod 25, and which rod can be clamped to said member 24 by means of a set screw 26. The lower end of rod 25 extends horizontally, as shown at 27, and is provided with an opening having a loose fit on the lower end of the stem 15 of the valve 12. This rod is held against longitudinal movement on the valve stem by means of nuts 28, one above and one below the end of said rod. These nuts, however, are not tightly clamped against the ends of the rod, so that said rod has rotary movement on the valve stem.

It is obvious from the foregoing that when the set screw 26 is set to clamp the rod 25 to the yoke 22 the actuation of the lever 20 opens both valves. It is also obvious that the extent of opening of the valve 12 depends upon the distance between the yoke 22 and the fulcrum of the lever 20, and that the extent of opening of the valve 11 depends upon the adjustment of the screw 21, so that by these means the relative volumes of spraying material and fluid pressure medium may be regulated as desired.

In case it is desired to clean the work by a blast of the fluid pressure medium without the application of coating material, it is merely necessary to loosen the set screw 26 to release the rod 25, when the operation of the lever 20 produces no effect on valve 12.

The valve and pipes described are secured to the bracket 7 of the tank by means of clamps 29 and bolts or screws 30, so the entire mechanism is carried by the tank. The free end of pipe 9 is adapted to have attached thereto a hose 31, or other suitable connection leading to a source of fluid pressure medium, preferably compressed air. The end of pipe 10 is connected by pipe 32 to the outlet 6 of the tank. This pipe is provided with a valve 33 by means of which the quantity of spraying material can be either regulated or entirely cut off. This valve will be opened more or less, depending upon the quantity of spraying material which it is desired shall be applied to the object. When cleaning the work by a blast of fluid pressure, as above described, the valve 33 will preferably be entirely closed, although this is not absolutely necessary since the valve 12 is preferably inoperative during this process. If the valve 33, however, is closed, it is not necessary to render the valve 12 inoperative by loosening set screw 26, as above described, when cleaning the work with a fluid pressure blast.

The spraying head 8 comprises a casing inclosing a chamber having therein two inwardly projecting annular shoulders 34 and being provided through one side substantially midway of its length with an opening 35 connecting with the liquid pipe 10, as shown. Into the outer end of the casing is threaded the spraying nozzle 36, a cap 37 being preferably used to provide a finish at the outer end of the head and also prevent the nozzle from being turned to destroy the adjustment. The inwardly projecting portion of the spraying nozzle is formed bell shaped, as shown at 38, and extends inwardly into the chamber in the casing somewhat beyond the center of the inlet opening 35. Fitting in the opposite end of the casing is nozzle 39, whose end projects into proximity to the bell mouth 38 of the spraying nozzle, but does not extend into said bell mouth, the relation being such that there is a slight free space between the end of the nozzle 39 and the end of the bell mouth, as shown. The end of the fluid pressure pipe 9 is provided with a fitting 40 adapted to bear against the outer end of nozzle 39, a gasket 41 being interposed between the two faces to prevent leakage. The union 42 serves to secure the head to the pipe 9 and to clamp the parts together so that a tight joint is formed between pipe 9 and nozzle 39.

The internal diameter of the spraying head must be fixed with reference to the diameter of the bell mouth of the spraying nozzle, and the relation between the ends of said bell mouth and of nozzle 39 must also be fixed, in order to prevent dripping. By properly forming and assembling these parts I am able to prevent all dripping at the nozzle, and to overcome this objectionable feature without a special construction providing for blowing fluid pressure medium out through a space surrounding the spraying nozzle, as has heretofore been done. This result is accomplished by forming each of the nozzles 36 and 39 with shoulders to engage the respective shoulders 34 on the casing, as particularly shown in Fig. 4. The caps 37 and 42 when screwed down, thus seat the two nozzles in proper relative position and, since the nozzles are preferably constructed in such size and form as to obtain the best result when engaged with their respective shoulders, it is impossible to position them in any other than in the proper manner.

The spraying device illustrated and described acts entirely by suction, or upon the ejector principle. No pressure is applied to the liquid in tank 1 to force the liquid to the spraying head, but the liquid is drawn to the spraying head solely by the ejector action of nozzle 39 in conjunction with the bell mouth 38 of spraying nozzle 36. In use, the tank is supplied with a spraying liquid of the desired character, and is then closed. The device as a whole can be readily carried about and handled. The screw 21 and yoke 22 will be so adjusted as to open the fluid pressure and liquid valves to the desired extent to supply the requisite volume of each of said mediums. By merely pressing on lever 20 both of these valves are simultaneously opened to the desired extent to secure the necessary spraying action. In handling the device one hand of the operator grasps the handle 2, while the thumb of the other hand rests on the end of lever 20 and the fingers of said hand pass underneath pipe 10, so that this hand not only operates the valves but it also assists in supporting and handling the device.

All the parts are of simple and durable construction and cannot readily get out of order.

What I claim is:

1. In a spraying machine, the combination of a portable tank, a spraying head comprising a casing inclosing a chamber and having a spraying nozzle, a pipe for connecting the chamber and the interior of the tank, and a fluid pressure connection to said chamber, said pipe and said connection being attached to the side of a tank substantially at its vertical center and serving as carrying handles therefor.

2. In a spraying machine, a spraying head comprising a casing inclosing a chamber having shoulders thereon, a nozzle connected to the casing and having a bell mouth in the chamber and a shoulder for engagement with the casing, a cap arranged to bear upon and clamp the nozzle to the casing an ejector nozzle projecting into the chamber and having a shoulder for engaging the casing, the respective shoulders on the nozzles and casing being so arranged as to properly position the ejector nozzle and bell mouth with reference to each other, the ejector nozzle being arranged for connection to a source of fluid pressure and the casing having an opening for the introduction of spraying material thereto.

3. In a spraying machine the combination of a tank, a spraying head comprising a casing inclosing a chamber connected to said tank, a nozzle provided with a bell mouth projecting into said chamber, an ejector nozzle also projecting into said chamber into such proximity to the bell mouth as to leave a free space between its end and the end of said bell mouth, fluid pressure connections to said ejector nozzle, and engaging shoulders on the casing and respective nozzles to properly position the nozzle and bell mouth with reference to each other, and means for clamping the nozzles to the casing with said shoulders engaging.

4. In a spraying machine the combination of a tank provided with an inclined curved bottom having an outlet from its extreme lower portion, a spraying head comprising ejector members, a pipe connecting the outlet of the tank to said spraying head, a fluid pressure pipe also connected to said spraying head, a control valve in each of said pipes, and operating means for said valves, said pipes being attached to said tank above the outlet and forming a carrying handle therefor.

5. In a spraying machine the combination of a tank provided with a filling opening, a strainer in conjunction with said opening, a bottom for the tank sloping to an outlet opening at its extreme bottom, a spraying head comprising ejector members, a pipe connecting the outlet of the tank with said spraying head, a fluid pressure pipe also connected to said head, a control valve in each of said pipes, said pipes being attached to said tank above the outlet forming a carrying handle therefor, and means adjacent the pipes for operating said valves simultaneously.

6. In a spraying machine the combination of a tank, an ejector spraying head, a pipe connecting the tank with said head, a fluid pressure pipe also connected to said head, a control valve in each of said pipes, a valve operating lever, and connections between said lever and each of said valves, said connections being adjustable to vary the effective distance between either valve and its point of connection to said lever.

7. In a spraying machine the combination of a tank, an ejector spraying head, a pipe connecting the tank with said head, a fluid pressure pipe also connected to said head, a control valve in each of said pipes, a valve operating lever, means for operatively coupling either valve to said lever, said means being also adjustable to vary the effective distance between either valve and its point of connection to said lever.

8. In a spraying machine the combination of a tank, an ejector spraying head, a pipe connecting the tank with said head, a fluid pressure pipe also connected to said head, a control valve in each of said pipes, a valve operating lever, connections between said lever and each of said valves, the connections between the lever and the liquid control valve comprising a yoke on said lever, a rod slidable with reference to said yoke and connected to the valve, and a set screw for clamping said rod to said yoke, and a cutoff regulating valve in the liquid pipe between the control valve and the tank.

9. In a spraying machine the combination of a tank, an ejector spraying head, a pipe connecting the tank with the head, a fluid pressure pipe also connected to said head, a control valve in each of said pipes, a valve operating lever, a yoke slidably mounted on said lever, a valve operating rod loosely and slidably engaged with said yoke, and means for fixedly securing said rod to said yoke.

10. In a spraying machine the combination of an ejector spraying head, a liquid pipe and a fluid pressure pipe connected to said head, a control valve in each of said pipes, an operating lever for said valves, a yoke adjustable longitudinally on said lever, a rod connected to said yoke and having its end extending at right angles and provided with an opening through which passes the stem of the liquid control valve, and means connecting said rod end to said stem in a manner to permit said rod to rotate about said stem and prevent longitudinal movement of said rod on said stem.

11. In a spraying machine the combination of an ejector spraying head, a liquid pipe and a fluid pressure pipe connected to said head, a control valve in each of said pipes, a valve operating lever connected to each of said valves, one of said valves being provided with an actuating rod provided with a slot extending longitudinally of said rod into which slot the operating lever extends, and a screw carried by said rod and forming an adjustable abutment for said lever.

In testimony whereof, I have hereunto set my hand.

WILLIAM O. QUEST.

Witnesses:
  JAS. L. WELDON,
  MARY E. CAHOON.